United States Patent
Al-Banna et al.

(10) Patent No.: US 9,577,756 B2
(45) Date of Patent: Feb. 21, 2017

(54) OPTICAL BEAT INTERFERENCE DETECTION AND MITIGATION

(71) Applicant: ARRIS Enterprises, Inc., Suwanee, GA (US)

(72) Inventors: Ayham Al-Banna, Orland Park, IL (US); Lawrence C. Spaete, Jr., Naperville, IL (US); Sebnem Zorlu Ozer, Perkasie, PA (US); John Ulm, Pepperell, MA (US); Amarildo Vieira, Philadelphia, PA (US); Zoran Maricevic, West-Hartford, CT (US); Douglas Pieri, Westminster, CO (US)

(73) Assignee: ARRIS Enterprises, Inc., Suwanee, GA (US)

( * ) Notice: Subject to any disclaimer, the term of this patent is extended or adjusted under 35 U.S.C. 154(b) by 357 days.

(21) Appl. No.: 14/262,022

(22) Filed: Apr. 25, 2014

(65) Prior Publication Data

US 2015/0280816 A1 Oct. 1, 2015

Related U.S. Application Data

(60) Provisional application No. 61/970,895, filed on Mar. 26, 2014.

(51) Int. Cl.
*H04B 10/08* (2006.01)
*H04B 10/2575* (2013.01)
*H04B 10/077* (2013.01)

(52) U.S. Cl.
CPC ...... *H04B 10/2575* (2013.01); *H04B 10/0773* (2013.01)

(58) Field of Classification Search
CPC .................. H04B 10/07951; H04B 10/0773; H04B 10/2575; H04B 10/2503; H04B 10/2507; H04B 10/0795; H04J 14/0257; H04J 3/1694; H04J 14/08; H04L 25/08; H04Q 11/0067
USPC ............. 398/25–28, 30–36, 66–72, 115–117
See application file for complete search history.

(56) References Cited

U.S. PATENT DOCUMENTS

| | | | | |
|---|---|---|---|---|
| 5,959,408 A | * | 9/1999 | Steel | H05B 41/295 315/106 |
| 8,385,400 B2 | * | 2/2013 | Taher | H04L 25/03019 375/232 |
| 8,433,195 B2 | * | 4/2013 | Biegert | H04L 12/2856 398/25 |
| 8,477,807 B1 | * | 7/2013 | Winters | H04L 12/2801 370/485 |
| 8,837,953 B2 | * | 9/2014 | Mutalik | H04B 10/25751 398/140 |
| 9,031,409 B2 | * | 5/2015 | Nandiraju | H04L 12/2801 398/66 |

(Continued)

*Primary Examiner* — Hibret Woldekidan
(74) *Attorney, Agent, or Firm* — Lori Anne D. Swanson

(57) ABSTRACT

An OBI manager provides the reduction/elimination of optical beat interference (OBI). As will be described in more detail below, the OBI manager identifies OBI partners through an identification process performed via an RFoG network. An OBI partner may be two optical networking units (ONUs) that may interfere with one another when transmitting in the same time slot. Once the OBI partners are identified, the OBI manager may perform a mitigation process to mitigate possible OBI. For example, the OBI manager may organize the OBI partners to reduce OBI, such as by guaranteeing no OBI partners transmit at the same time.

29 Claims, 10 Drawing Sheets

(56) References Cited

U.S. PATENT DOCUMENTS

| | | | | |
|---|---|---|---|---|
| 2008/0025724 A1* | 1/2008 | Ozaki | ............... | H04Q 11/0067 398/68 |
| 2008/0310842 A1* | 12/2008 | Skrobko | .......... | H04B 10/25753 398/72 |
| 2012/0275792 A1* | 11/2012 | Nandiraju | ........... | H04L 12/2801 398/66 |
| 2012/0308237 A1* | 12/2012 | Mutalik | ........... | H04B 10/25751 398/116 |
| 2014/0175267 A1* | 6/2014 | Thiel | ...................... | H01S 3/235 250/216 |
| 2016/0099778 A1* | 4/2016 | Maricevic | .......... | H04B 10/2575 398/115 |

\* cited by examiner

| Group | Members | |
|---|---|---|
| 0 | 1, 7, 8, 17, 20 | → 5 members |
| 1 | 2, 10, 14, 28, 32 | → 5 members |
| 2 | 3, 4, 6, 12, 13, 15, 18, 19, 23, 27, 30, 31 | → 12 members |
| 3 | 5, 11, 21, 24, 25, 29 | → 6 members |
| 4 | 9, 26 | → 2 members |
| 5 | 16, 22 | → 2 members |

FIG. 11

OPTICAL BEAT INTERFERENCE DETECTION AND MITIGATION

CROSS-REFERENCES TO RELATED APPLICATIONS

The present disclosure claims the benefit of U.S. Provisional App. No. 61/970,895, entitled "RFOG OBI DETECTION AND MITIGATION", filed Mar. 26, 2014, the contents of which is incorporated herein by reference in its entirety.

BACKGROUND

Several network types exist for delivering media content, such as video, data, voice, or high-speed Internet services, for example, to subscribers. In a cable television (CATV) network, for example, the network may take the form of an all-coax, all-fiber, or hybrid fiber/coax (HFC) network, delivering media content from a headend to subscriber client devices. In addition to transporting data traffic, as well as television content signals over a CATV network, multiple services operators (MSO) also use their network infrastructure for carrying voice, video on demand (VoD) and video conferencing traffic signals, among other types.

Radio Frequency (RF) over Glass (RFoG) is a fiber to the home (FTTH) technology that may operate concurrently with an HFC network, such as out of the same headend/hub in a cable network. RFoG permits the continued use of traditional HFC equipment and back-office applications with fiber-to-the-premise deployments. For example, RFOG enables cable operators to reuse existing headend equipment and infrastructure of Data Over Cable Service Interface Specification (DOCSIS) service delivery. Thus, use of existing cable modem termination system (CMTS) platforms, headend equipment, set-top boxes, and cable modems can continue while gaining benefits inherent with RFoG systems. For example, concurrent RFOG/HFC operation enables the use of RFoG for node splitting, which may increase capacity in an existing HFC network.

A phenomenon called optical beat interference (OBI) may occur in RFoG systems when two return transmitters hit a receiver simultaneously on the same wavelength. In a cable system, for example, the condition that causes OBI can easily occur in multiple-dwelling unit (MDU) applications of DOCSIS-based systems with bonded upstream channels. OBI can potentially impact the entire return path performance and will become an increasing concern as return path bandwidth and utilization grows.

BRIEF DESCRIPTION OF THE DRAWINGS

FIGS. 10 and 11 illustrate the identification and grouping process according to one embodiment.

DETAILED DESCRIPTION

Described herein are techniques for an OBI identification and mitigation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

An OBI manager provides the reduction/elimination of optical beat interference (OBI). As will be described in more detail below, the OBI manager identifies OBI partners through an identification process performed via an RFoG network. An OBI partner may be two optical networking units (ONUs) that may interfere with one another when transmitting in the same time slot. Once the OBI partners are identified, the OBI manager may perform a mitigation process to mitigate possible OBI. For example, the OBI manager may organize the OBI partners to reduce OBI, such as by guaranteeing no OBI partners transmit at the same time.

System Overview

Figure 1:
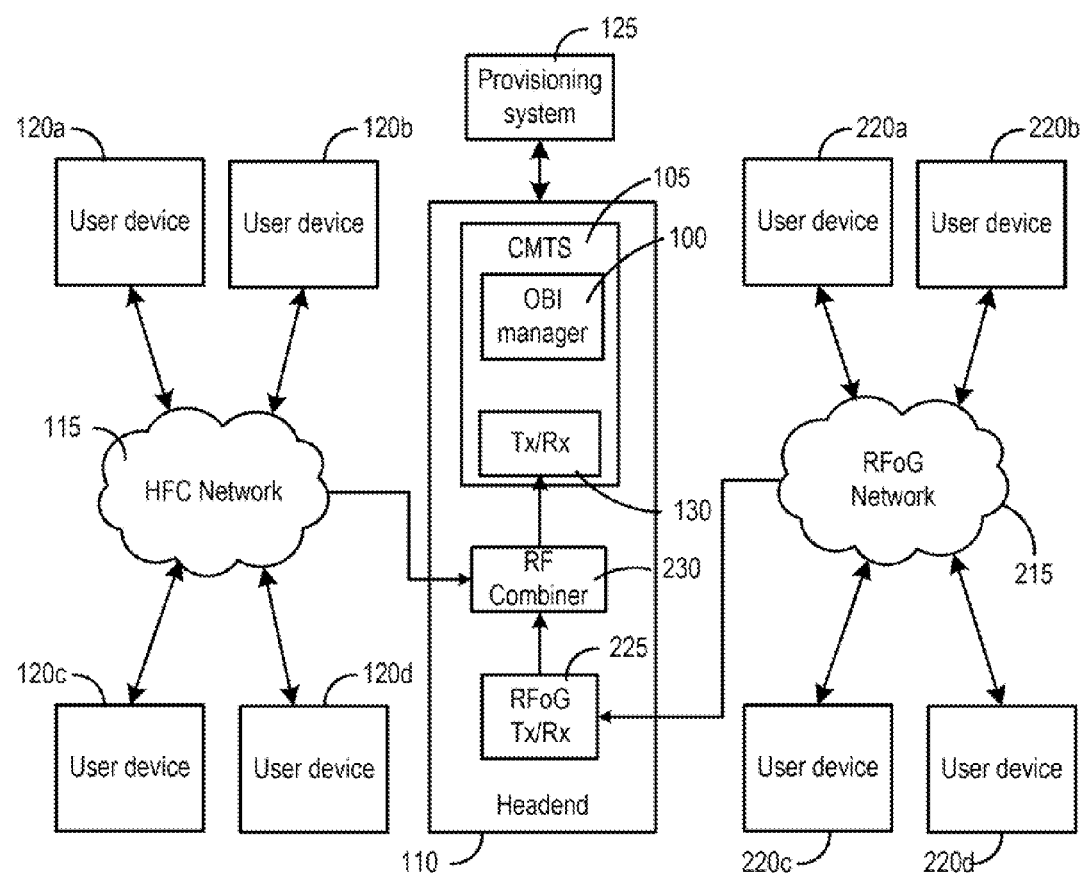
FIG. 1 is an illustration of an example radio frequency over glass (RFoG) network that is deployed with an existing Hybrid Fiber-Coaxial (HFC) network.

FIG. 1 is an illustration of an example radio frequency over glass (RFoG) network 215 that is deployed with an existing Hybrid Fiber-Coaxial (HFC) network 115. The system can include a cable modem termination system (CMTS) 105 located at a headend 110 of a multiple service operator (MSO), such as a cable company. As described in more detail below, CMTS 105 can be used to serve customers on a Hybrid Fiber-Coaxial (HFC) broadband network, a Radio Frequency over Glass (RFoG) broadband network, or a mixed HFC and RFoG network. One or more user devices 120*a-d* (e.g., cable modems, embedded media terminal adapters (EMTAs—also known as cable telephony modems, or set-top boxes) can communicate with the CMTS 105 through HFC network 115. It should be understood that only four user devices 120*a-d* are shown (for illustrative purposes), but more may be deployed. FIG. 1 can also include a provisioning system 125 that can configure settings of one or more CMTSs.

CMTS 105 is typically provided at a headend 110 or hub site of a broadband network for providing high speed data services such as Internet, Voice over Internet Protocol, or digital video services to subscribers of a cable TV operator or to like customers. CMTS 105 hosts downstream and upstream ports and contains numerous receivers, each receiver handling communications between hundreds of end user devices (e.g., network elements) connected to the broadband network. Examples of network elements include cable modems, set top boxes, televisions equipped with set top boxes, Data Over Cable Service Interface Specification (DOCSIS) terminal devices, media terminal adapters (MTA), EMTAs, and the like.

In some implementations, headend 110 can provide video, data and voice service to a subscriber. CMTS 105 can include a processor, a memory, and a storage device. It may also have one or more transmitters/receivers 130 for transmitting signals through one or more networks, including the HFC network 115, to one or more user devices 120a-d. The transmitters/receivers 130 can be one or more separate transmitter and receiver components residing on the same board, or separate boards; further, the transmitter and receiver can also include various sub-components, such as modulators and demodulators. CMTS 105 can also receive data signals from user devices, such as cable modems 120a-d, EMTAs, and/or set top boxes, through one or more networks, including the HFC network 115.

An RFoG topology includes an all-fiber service from the headend 110 to a field node, or optical network unit (ONU) (see FIG. 2), which is typically located at or near a user's premises. Although the RFoG network is described, other optical networks may be used. In the headend, a downstream laser sends a broadcast signal that is optically split multiple times. The optical network unit, or ONU, recovers the RF broadcast signal and passes it into the subscriber's coax network.

Optical networking units (ONUs) in RFoG network 215 terminate the fiber connection at a subscriber-side interface and convert traffic for delivery over the in-home network at the customer premises. Coaxial cable can be used to connect the ONUs of RFoG network 215 to one or more user devices 220a-d, wherein the RFoG user devices 220a-d can include cable modems, EMTAs, or set-top boxes, as with the user devices of an HFC network. For example, the ONU may connect to set-top boxes, cable modems, or similar network elements via coaxial cable, and one or more of the cable modems may connect to the subscriber's internal telephone wiring and/or to personal computers or like devices via Ethernet or Wi-Fi connections.

Upstream transmissions from the user devices 220a-d can pass through the RFoG network 215 and be received by an RFoG transmitter/receiver 225 at headend 110. In various implementations, the RFoG transmitter/receiver 225 may be one or more separate transmitter and receiver components residing on the same board, or alternatively separate boards; further, the transmitter and receiver may also include various sub-components, such as modulators and demodulators. The RFoG transmitter/receiver 225 receives the optically modulated signals on optical channels and demodulates the signals into the electrical signals, which may be RF signals. Signals from the RFoG network 215 may then be combined with one or more RF signals coming from other HFC networks such as HFC network 115, or from other RFoG networks using an RF combiner 230, before being received by the CMTS transmitter/receiver 130. The connections illustrated between the RFoG network 215 and the HFC network 115 and the CMTS transmitter/receiver reflect an upstream transmission only.

The return path for voice, data, video, and like upstream traffic from a user device 220 is through the ONU, which converts the upstream signal to an optical upstream signal and transmits the optical upstream signal to the return path RFoG optical receiver at headend 110 or hub. The RFoG optical receiver converts the upstream optical signal at headend 110 to an RF electrical signal for CMTS 105.

Accordingly, ONUs convert optical signals from headend 110 into electrical signals at the customer premises and thereby terminate the RFoG system at the subscriber-side interface. This is accomplished in place of the same function traditionally performed back at the higher-level serving area optical nodes in the HFC network. The RF infrastructure remains in place; the difference is that the optic fiber termination is moved from an optical fiber node of the HFC network to an RFoG ONU (R-ONU or ONU) at the customer premises. By way of example, the ONU can be located at a single home, a business, a multi-tenant dwelling (MTU/MDU) or an individual living unit within an MTU.

Although RFoG systems provide a possible capacity increase relative to traditional HFC systems, an undesired effect of an RFoG system is the potential for upstream interference that may occur when more than one ONU has the optical return path activated at any given time. For example, when amplitude modulation (AM) is used in the upstream path and optical upstream signals are received by the RFoG optical receiver 225 at the headend corresponding to overlapping transmissions or bursts from multiple ONUs of about the same wavelength or of close or proximate wavelengths, optical interference, such as an optical collision or optical beating may occur and cause optical beat interference (OBI).

OBI is signal degradation in systems using amplitude modulation that occurs when two or more lasers with closely-spaced optical frequencies or wavelength transmit into optical fiber and mix together in the RFoG optical receiver 125 causing splatter in the RF spectrum. The impact of OBI is packet loss, i.e., the transmissions transmitted via the ONUs cannot be properly demodulated at headend 110. That is, optical beat interference (OBI) may occur in RFoG systems when two return transmitters transmit and the transmissions overlap while transmitting or hit receiver 225 simultaneously on a closely spaced wavelength. Closely spaced may be around 0-200 picometers, but may be other proximate distances. This may particularly be a problem if the bursts or transmissions contain voice packets. In systems that use frequency modulation (FM) in the upstream path, any overlap of transmissions in time from different ONUs may cause upstream interference, even if the transmit wavelengths are far apart.

User devices 220 that have upstream channel bonding capability are therefore able to simultaneously transmit in different RF channels. Thus, as described above, the resulting simultaneous use of multiple channels by different user devices 220 in an RFoG system and increased usage of networks further enhance a likelihood of OBI, upstream interference, and modulation errors. In a cable system, for example, the condition that causes OBI can easily occur in multiple-dwelling unit (MDU) applications of DOCSIS-based systems with bonded upstream channels. OBI can potentially impact the entire return path performance and will become an increasing concern as return path bandwidth and utilization grows. Also, this affects downstream (DS) throughput in TCP-based applications as ACK packets get affected in the upstream.

In embodiments disclosed herein, an OBI manager 100 provides techniques for OBI reduction/elimination based on identifying the OBI partners within an RFoG Optical Network Unit (ONU) population. Once OBI partners are identified, OBI manager 100 performs a mitigation solution then may reduce OBI by making sure that no OBI partners transmit at the same time in one embodiment. OBI manager 100 may implement the mitigation solution through intelligent channel assignment, where OBI partners are sorted into groups and then each group is assigned to time-division multiplexing channel (i.e., TDMA/ATDMA channel), or by an enhanced intelligent scheduler. Also, any ONU that does not have OBI partners is free to transmit on all available upstream channels without restriction. OBI manager 100 continues to perform OBI identification as a background task to update OBI partners that may change over time.

Figure 2:
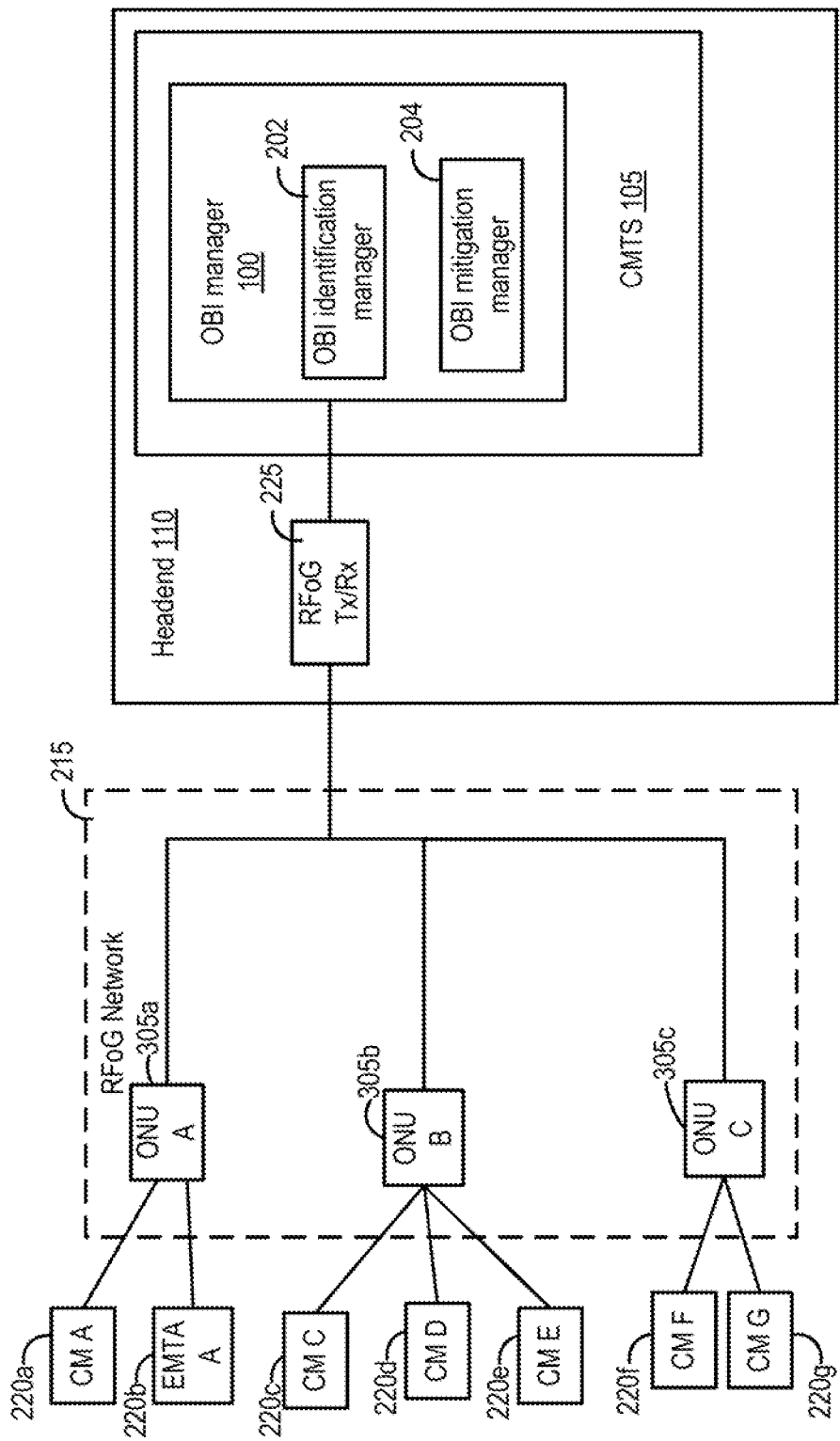
FIG. 2 depicts a more detailed example of a CMTS for identification and mitigation of OBI according to one embodiment.

FIG. 2 depicts a more detailed example of CMTS 105 for identification and mitigation of OBI according to one embodiment. OBI manager 100 includes an identification manager 202 and a mitigation manager 204. Identification manager 202 may perform the identification process to identify OBI partners among ONUs 305 that transmit to RFoG Tx/Rx 225. User devices 220a-220g are coupled to ONUs 305a-305c. Identification manager 202 identifies OBI partners between ONUs 305 based on user devices 220 transmitting upstream through ONUs 305. Once the OBI partners are determined, mitigation manager 204 performs a mitigation process with ONUs 305. Although the identification process and mitigation process are discussed as being performed together, the identification process and mitigation process may be performed independently and separately. For example, the mitigation process may be performed without performing any identification process, such as the mitigation process may be performed without CMTS 105 performing an identification process. That is, mitigation manager 204 may receive the identification of OBI partners without the requirement of performing the identification process through RFoG network 215. Also, CMTS 105 may perform the identification process without performing the mitigation process. Further, the different identification processes and mitigation processes described below may be used in different combinations.

Figure 3:
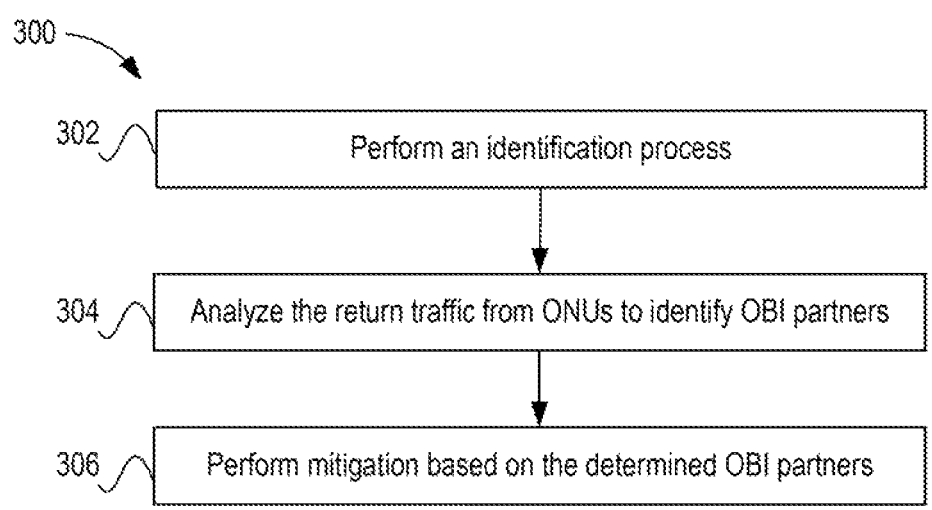
FIG. 3 depicts a simplified flowchart of a method for performing identification and mitigation of OBI according to one embodiment.

FIG. 3 depicts a simplified flowchart 300 of a method for performing identification and mitigation of OBI according to one embodiment. At 302, identification manager 202 performs an identification process. The identification process may analyze error statistics or use intelligent scheduling to determine OBI partners. Other identification processes may also be used. The identification processes involve CMTS 105 scheduling traffic from user devices 220 through ONUs 305 back to CMTS 105. At 304, identification manager 202 analyzes the return traffic from ONUs 305 to identify OBI partners. For example, when packets are lost during a time slot when two ONUs 305 transmit, identifier manager 202 may determine that these two ONUs 305 are possible OBI partners. The different identification processes will be described in more detail below.

Once the OBI partners are determined, at 306, mitigation manager 204 performs mitigation based on the determined OBI partners. The mitigation process may include different mitigation schemes, such as by assigning OBI partners to groups and channels or by scheduling OBI partner groups on different channels. These mitigation schemes may limit the time slots in which OBI partners potentially transmit at the same time. Other mitigation schemes may also be performed. The different mitigation processes will be described in more detail below.

OBI Identification

Identification manager 202 may perform different identification processes for identifying the OBI partners (e.g., a pair of ONUs 305). For example, identification manager 202 may perform one or more of the identification processes to determine the OBI partners. As discussed above, an OBI partner may be multiple ONUs 305 that may transmit using a closely spaced wavelength that interferes with each other. For example, user devices 220 coupled to each ONU 305 may transmit through a respective ONU 305. In one example, when a transmission from a first user device 220a through ONU A 305a transmits at a wavelength that interferes with a transmission from another user device 220c transmitting through ONU B 305b, OBI may result. Identification manager 202 performs identification processes to identify that ONU 305a and ONU 305b are possible OBI partners in this case.

Identification Using Error Statistics

Figure 4:
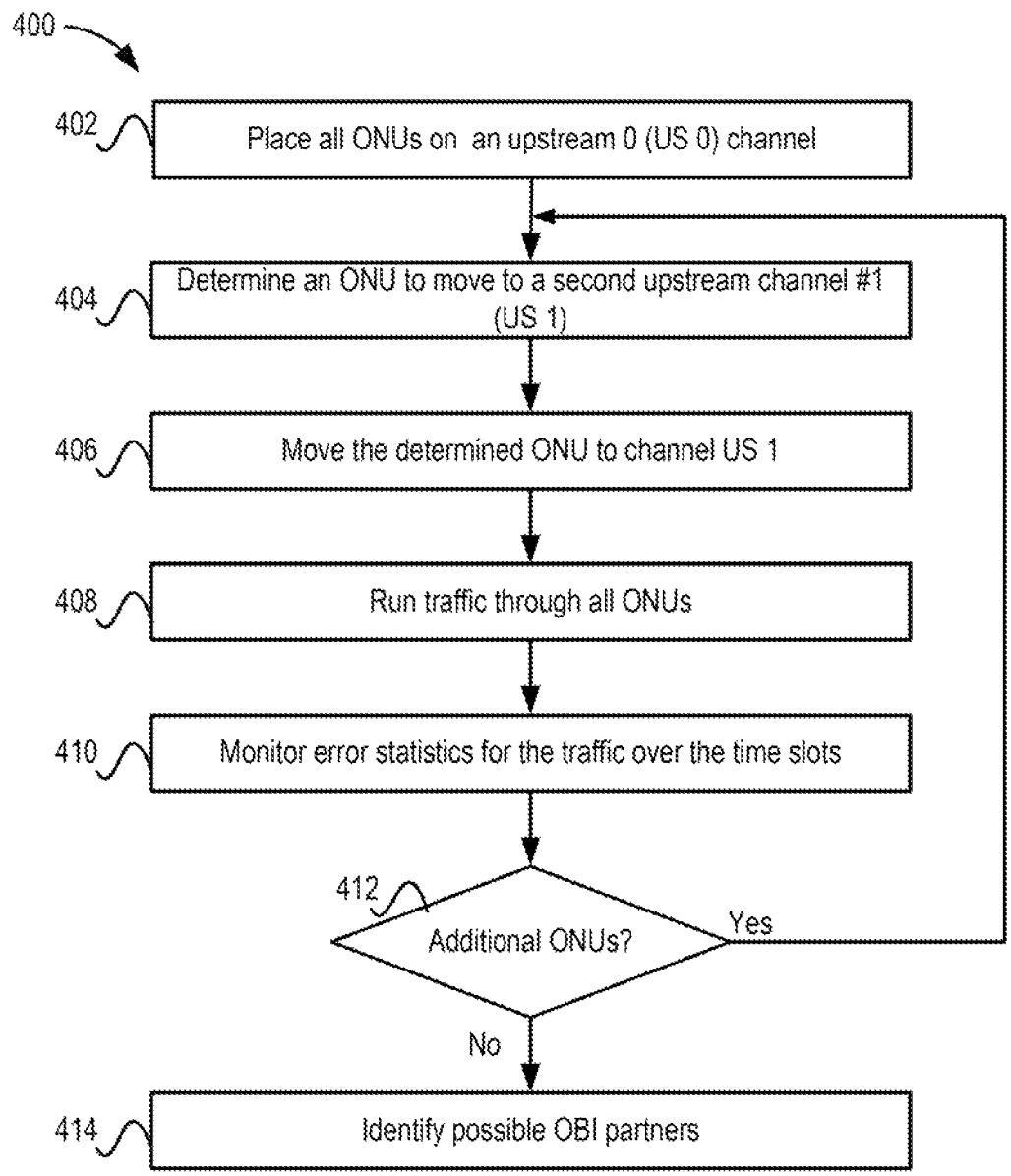
FIG. 4 depicts a simplified flowchart for determining OBI partners using error statistics according to one embodiment.

FIG. 4 depicts a simplified flowchart 400 for determining OBI partners using error statistics according to one embodiment. At 402, identification manager 202 places all ONUs 305 on one time division multiplexing (e.g., a TDMA/advanced TDMA (ATDMA)) channel that may be referred to as an upstream #0 (US 0) channel. The upstream channel may be from a user device 220 through an ONU 305 and RFoG network 215 to Tx/Rx 225.

At 404, identification manager 202 determines an ONU 305 (e.g., ONU 305a) to move to a second channel, referred to as upstream channel #1 (US 1). At 406, identification manager 202 moves the determined ONU 305 to channel US 1. In this case, ONU 305 on upstream channel US 1 is the only transmitting ONU on it.

When moving is discussed, ONUs 305 may be physically moved to a channels or may be just active on a channel without being physically moved. For physically moving an ONU 305, a user device 220 may be physically moved and only allowed to use a single upstream channel. Another embodiment uses classification and multiple service flows. In this case, a service flow is set up on user device 220 such that the user device would only be allowed to transmit on one specific upstream channel. There would be one of these service flows for each upstream channel in ONU 305. Additionally, only data of a very specific type would be allowed to use the service flow. For example, it might be that the ping/data packet would be required to have a specific IP source and destination port. Then, identification manager 202 makes sure that no other data is sent upstream in a specific time slot and then send pings to the user device with the proper source and destination ports to cause the ping response to transmitted back on the desired upstream channel in the desired time slot. The rest of the ONUs would have user devices 220 set up to transmit on the other channel using another service flow. To move the ONUs 305 to other channels, identification manager 202 can change the service flows for different user devices behind the ONUs.

At 408, identification manager 202 then runs traffic through all ONUs 305. For example, identification manager 202 may send pings to multiple user devices 220 via ONUs 305 using a ping feature. The ping feature causes user devices 220 to respond to the ping and transmit upstream with a response. The responses are sent through ONUs 305 back to headend 110, such as through Tx/Rx 225 of headend 110. In one example, identification manager 202 may identify user devices 220 behind each ONU 305. Identification manager 202 then sends simultaneous pings to certain user devices 220 (e.g., one unique user device 220 behind ONUs 305) in the manner described below.

In one embodiment, identification manager 202 runs traffic through ONU 305a on channel US 1 continuously and only for ONU 305a. However, on channel US 0, all the other ONUs 305 transmit sequentially, which means identification manager 202 causes only one ONU 305 to transmit during a single time slot on channel US 0. This allows identification manager 202 to identify which ONUs 305 interfere with ONU 305a. For example, identification manager 202 may schedule a user device 220c behind ONU 305b during a first time slot and then a user device 220f behind ONU 305c during a second time slot.

At 410, identification manager 202 monitors error statistics for the traffic over the time slots. For example, identification manager 202 may monitor error counts that occur for the transmissions being run through ONUs 305 on channel US 0 and ONU 305a on channel US 1. In one embodiment, the error statistics may be forward error correction (FEC) counts, such as FEC code words (CW) counts for each user device 220. Forward error correction may include redundant data in the response to allow devices to recover data that is lost when packets are dropped or lost. As discussed above, packets may be lost due to OBI. If a packet is dropped, then CMTS 105 increments the FEC counter. Identification manager 202 may analyze the FEC counter for each user device 220 to determine which ONUs 305 on channel US 0 had OBI with ONU 305a on channel US 1. For example, if packets were dropped when a response was supposed to be received from ONU 305b on channel US 0, then identification manager 202 may determine that OBI occurred and ONU 305b and ONU 305a are OBI partners. To identify this, identification manager 202 may use the FEC counter to determine that packets and/or code words were dropped during the time slot. The above process may be performed multiple times where identification manager 202 causes traffic to be transmitted on channel US 0 and US 1 by each ONU 305 multiple times.

At 412, after identification manager 202 has caused traffic to be transmitted through all ONUs 305 in channel US 0 to identify any OBI partners with ONU 305a on channel US 1, identification manager 202 determines if additional ONUs 305 need to be switched to channel US 1 for testing. If so, the process reiterates to 404 where identification manager 202 replaces the ONU on channel US 1 for another ONU on channel US 0. The above process for identifying if the ONU on channel US 1 is an OBI partner with other ONUs on channel US 0 is then repeated. The process repeats itself until it is determined that all combinations for testing for OBI partners has been completed. As will be discussed below, the testing may involve a combinatorial problem.

When the testing is completed, at 414, identification manager 202 identifies possible OBI partners. For example, if any errors (e.g., packets lost above a threshold) occurred during the above process, identification manager 202 sets a flag for the ONUs 305 in which an error occurred. Identification manager 202 then considers these ONUs 305 as OBI partners.

Figure 5:
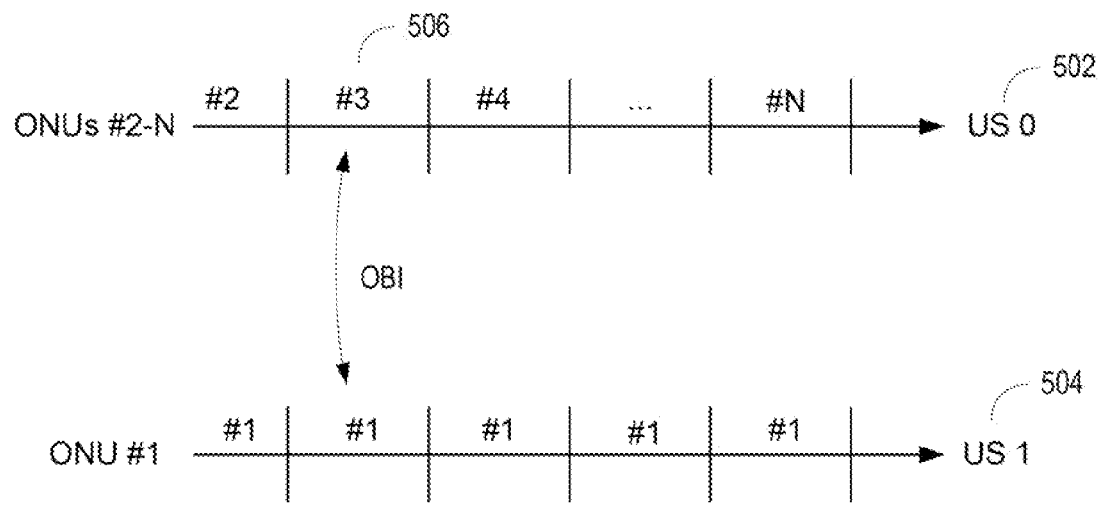
FIG. 5 shows an example of identifying ONUs on channels US 0 and US 1 as OBI partners according to one embodiment.

FIG. 5 shows an example of identifying ONUs 305 on channels US 0 and US 1 as OBI partners according to one embodiment. As shown, at 502, identification manager 202 has scheduled ONUs #2-N on channel US 0 using TDMA. That is, ONUs #2-N have been scheduled in different time slots on channel US 0. At 504, identification manager 202 schedules ONU #1 continuously on channel US 1 in each time slot.

Then, identification manager 202 monitors for errors that occur during the time slots. For example, errors may occur when ONU #3 transmits packets to CMTS 105 during the time slot shown at 506. In this case, CMTS 105 may not receive some packets during the time slot that are expected. Because ONU #3 is only transmitting during the time slot shown at 506, identification manager 202 can determine that ONU #3 may be an OBI partner with ONU #1.

The example in FIG. 5 is a simple example that does not show all of the possible combinations. However, the following example describes a combinatorial method of testing for OBI partners. Identification manager 202 may index all user devices 220 from #1 to K. Then, identification manager 202 assigns all user devices 220 to corresponding ONUs 305 #1 to N. Identification manager 202 may then select a user device 220 to uniquely represent each ONU 305 for a total subset of #1 to N user devices 220 with the assumption that K>N. For example, ONUs 305 may be connected to multiple user devices 220. One of the user devices 220 connected to each ONU 305 is selected to represent that ONU.

Identification manager 202 then creates an organized combinatorial of representative user device/ONU pairings. The total number of which is combinatorial (N/2)=N*(N−1)/2. For example, if N=50, combinatorial (N/2)=50*49/2=1,225 pairings.

Identification manager 202 then sets a testing loop at CMTS 105 to walk through all of the pairings, that is, a total of 1,225 pairings. As described above, identification manager 202 may move ONUs 305 to channel US 1 to test the pairings.

Identification manager 202 listens for any OBI (error counts) during the period of time in which packets from a particular pairing were supposed to arrive at CMTS 105. If identification manager 202 determines OBI occurred, identification manager 202 stores an OBI flag for the pairing. When the testing loop is completed, identification manager 202 determines a result of pairings that produce OBI. This process may continue as identification manager 202 proactively tests for OBI among ONUs 305 continuously and may update OBI flags for each pairing.

Using the error statistics may be useful in determining OBI partners. However, the errors may occur for reasons other than OBI. For example, noise may cause the packets to drop. Also, a larger number of ONUs may make the identification process longer than desired. Identification manager 202 may thus use other identification processes that may address the above.

Identification Using Scheduling

Identification manager 202 may optimize scheduling of ONUs 305 on different channels to identify OBI partners. In one embodiment, identification manager 202 may schedule more than two ONUs 305 in a single time slot to determine OBI partners on upstream channels. In one example, if no packets are lost for the group, then identification manager 202 may determine that ONUs in this group are not OBI partners. Accordingly, in this case, a group larger than a pair can be tested. However, if a packet is lost, then identification manager 202 needs to perform more testing to single out the OBI partners. Assuming that OBI occurs in this group, identification manager 202 may alter the groups as will be described in more detail below to continue further testing to determine the OBI partners. Also, as mentioned above, if a small amount of packets is lost out of several requests, such as one packet, then this loss may be due to a noise rather than an OBI partner. Identification manager 202 may decide to retest the identification process in this case.

Figure 6:
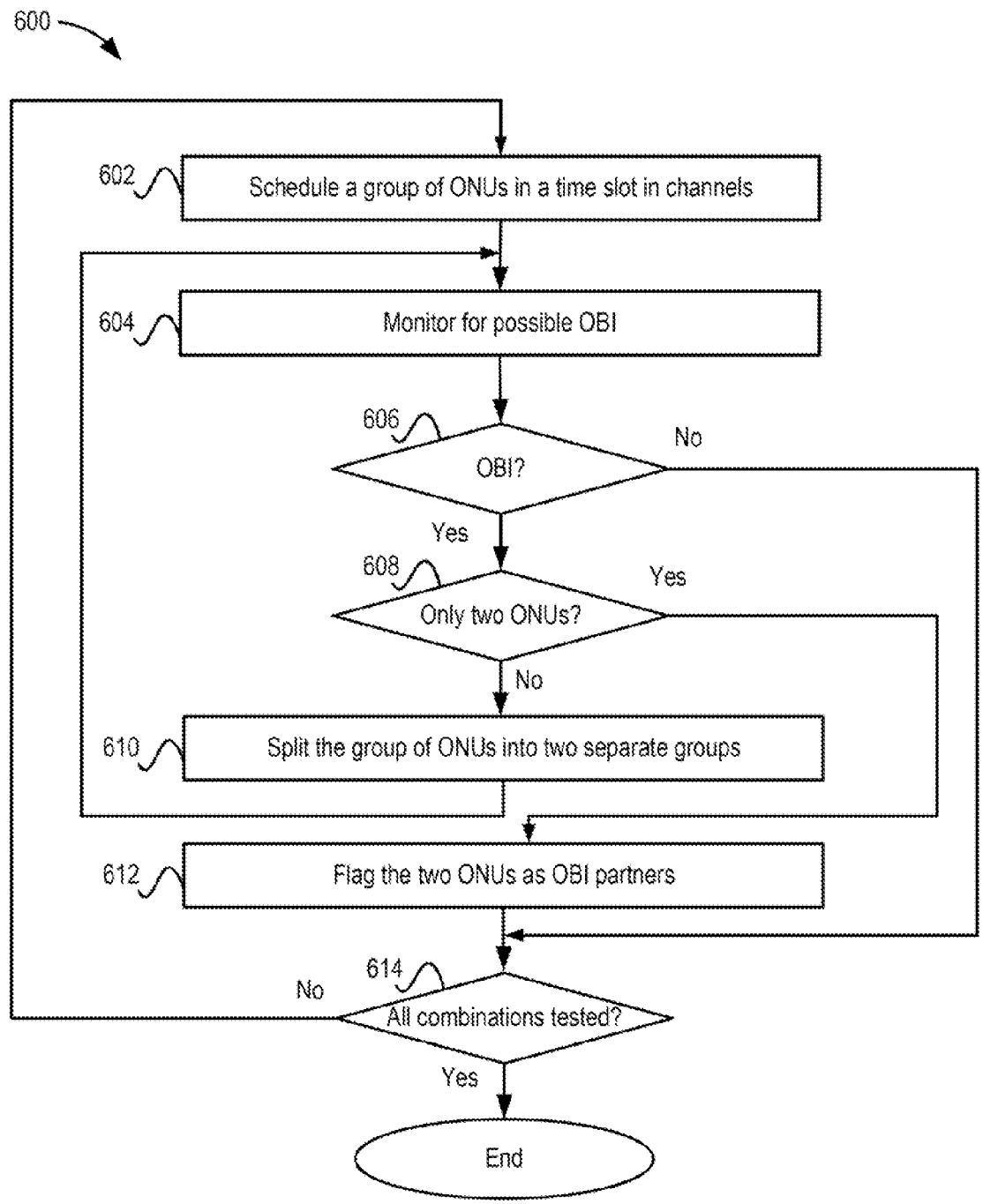
FIG. 6 depicts a simplified flowchart of a method for identifying OBI partners using scheduling according to one embodiment.

FIG. 6 depicts a simplified flowchart 600 of a method for identifying OBI partners using scheduling according to one embodiment. At 602, identification manager 202 schedules a group of ONUs 305 in a time slot in channels, such as in all possible upstream channels. For example, if four channels are available, identification manager 202 may schedule four ONUs 305 separately in the four channels. Some technologies, such as synchronous CDMA (S-CDMA), and orthogonal frequency-division multiple access (OFDMA)

support multiple transmit opportunities in a given time slot and identification manager 202 can schedule multiple ONUs 305 in a given time slot.

Then, at 604, identification manager 202 monitors for possible OBI. For example, if Tx/Rx 225 receives all requested packets successfully, then identification manager 202 can determine that all ONUs 305 that were scheduled are not OBI partners with each other and a new group can be selected. This is because no errors or interference occurred with the return packets from all ONUs 305 and thus identification manager 202 can determine that no OBI occurred for these ONUs 305 at 606. In this case, the process proceeds to 614 where identification manager 202 determines if other groups need to be tested. However, if identification manager 202 determines that OBI occurred, such as some requested packets are lost (e.g., the number of requested packets lost is over a threshold), then identification manager 202 determines that OBI most likely occurred. In this case, identification manager 202 may not be able to determine which ONUs 305 are OBI partners due to the large number of ONUs 305 scheduled simultaneously in a time slot. That is, the process continues until there are only two ONUs 305 in a group. Thus, at 608, identification manager 202 determines if two ONUs are not in the group, and if so, then the process continues at 610 where identification manager 202 splits the group of ONUs into two separate groups. The process reiterates to 602 to continue the scheduling of the groups separately. That is, the first group is scheduled in a time slot and then identification manager 202 schedules the second group in another time slot. This process continues until the groups are reduced to two ONUs 305 under test and requested packets are lost over a threshold. When this occurs, at 612, identification manager 202 flags the two ONUs 305 as OBI partners.

At 614, when testing of the group has finished, identification manager 202 determines if all possible OBI partner combinations have been tested. If not, the process reiterates to 602 to continue testing. However, if all possible combinations have been tested, the process ends.

Figure 7:
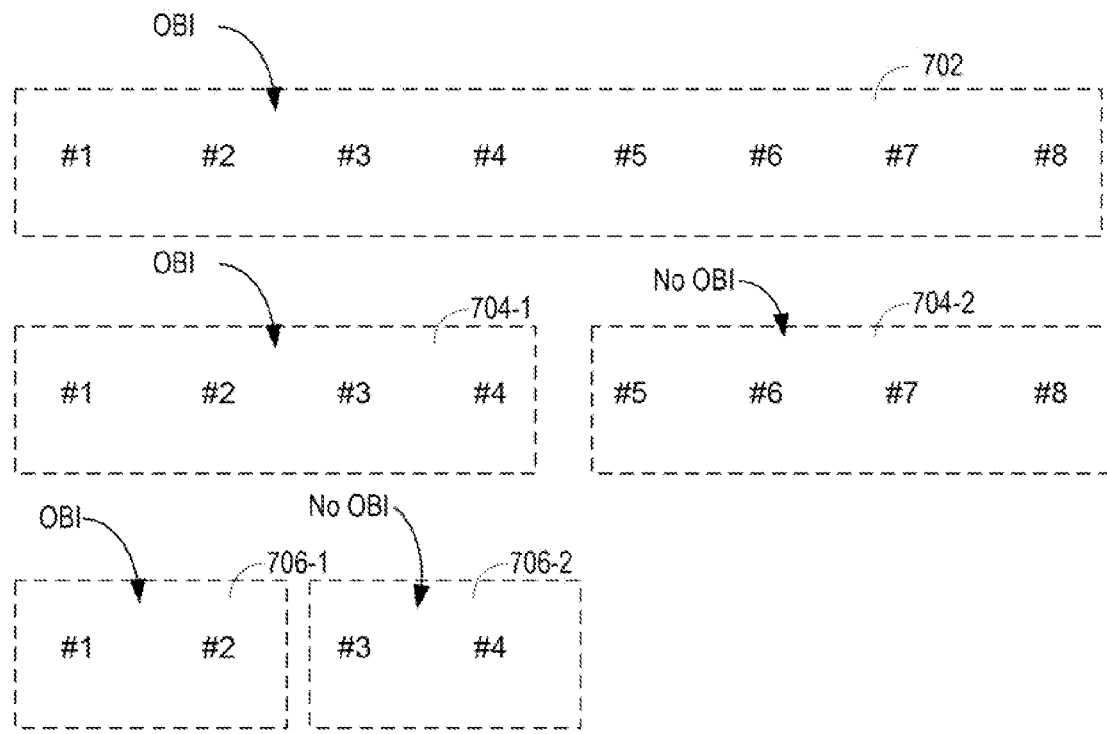
FIG. 7 shows an example of the scheduling process according to one embodiment.

FIG. 7 shows an example of the scheduling process according to one embodiment. At 702, identification manager 202 has scheduled eight ONUs #1-8 on eight channels in a first time slot. Identification manager 202 then determines if OBI possibly occurred. In this case, OBI occurs, and at 704-1, identification manager 202 schedules ONUs #1-4 in a first group in a second time slot and ONUs #5-8 in a second group in a third time slot at 704-2. In this case, identification manager 202 determines that ONUs #5-8 do not experience any OBI and determines that ONUs #5-8 are not OBI partners. However, ONUs #1-4 may experience OBI. In this case, at 706-1, identification manager 202 schedules ONUs #1 and #2 in a fourth time slot and at 706-2, schedules ONUs #3 and #4 in a fifth time slot. Identification manager 202 may then determine that OBI occurs with ONUs #1 and #2, but determines that OBI does not occur with ONUs #3 and #4. Thus, identification manager 202 determines that ONUs #1 and #2 are OBI partners and ONUs #3 and #4 are not. To summarize, identification manager 202 determines that ONUs #1 and #2 are OBI partners in a total of five time slots. Using the two channel method described above may have needed seven time slots. Although five time slots are described, the above process may take longer to test all possible OBI partners, which can happen if one OBI partner is split into one group and the other OBI partner is split into the other group. To detect the OBI partners, identification manager 202 may have to split the groups of ONUs #1-#8 differently or in other combinations.

In other embodiments, identification manager 202 may identify OBI partners for each ONU 305 by scheduling a specific ONU 305 for upstream transmission concurrently with other ONUs 305 (e.g., one other ONU 305 at a time). This process repeats until identification manager 202 goes through all ONUs 305 and identifies the OBI partners for each ONU 305. This process may be similar to the identification process above using two channels.

Identification Via Other Methods

Identification manager 202 may also identify OBI pairs with reference to wavelength measurements. Once OBI pairs or groups are identified using one of the above approaches via scheduling or error analysis, identification manager 202 can relate the groups back to wavelength measurements of corresponding ONUs 305. In particular, identification manager 202 can estimate the needed wavelength separation to declare OBI-safe transmissions and also separate a population into multiple groups based on wavelength measurements. This may save time such that identification manager 202 can adjust future groupings based on wavelength measurements. In one embodiment, a 200 picometers (pm) or so threshold may be good to separate a population into multiple groups, but other thresholds may be used, such as 500 pms, where the larger the threshold, the less likely OBI will occur.

In another embodiment, the code word error rate may be proportional to signal-to-noise ratio (SNR) degradation due to OBI, which is inversely proportional to the wavelength separation. Essentially, the wavelength separation can be deduced from error statistics. Identification manager 202 can build a map showing the ONU pair relationships and based on that, identification manager 202 can segregate user devices 220.

In the case of a multiple dwelling unit (MDU) application, many user devices 220 may be connected behind a single ONU 305. The OBI partner identification process may be helped with the usage of physical grouping knowledge. For example, all user devices 220 behind a single ONU (e.g., physically grouped) cannot be OBI partners. Other identification methods could be based on similarity beat map results. The OBI identification process may also be helped by analyzing the OBI spectral signatures of different ONUs 305 to estimate wavelength separation (e.g., based on the beat spectrum amplitude/slope) or to identify user devices 220 behind the same ONU 305.

The above OBI identification processes may be run periodically in case OBI affects change over time or no new user devices 220 or ONUs 305 are added to RFoG network 215. Identification manager 202 may use some of its existing knowledge on OBI partners to accelerate future identification process. OBI effects may change fairly rapidly over time (e.g., due to temperature changes in a laser), thus identification manager 202 may decide to do periodic OBI identification more frequently on current OBI partners as well as recent previous OBI partners (as wavelength frequencies may drift in and out of an OBI region).

Mitigation

Mitigation manager 204 may perform various mitigation processes. The basic mitigation process may guarantee that when an ONU 305 transmits, no OBI partners for that ONU 305 transmit at the same time. The following will describe various mitigation processes that may guarantee the above, such as mitigation based on grouping and channel assignment and also a different approach using scheduling. Further, mitigation may be helped if a stronger forward error correction scheme is used that can survive an OBI event if/when OBI occurs, but the usefulness of the forward error correction may depend on the nature of the OBI event.

Mitigation Using Channel and Group Assignment

Figure 8:
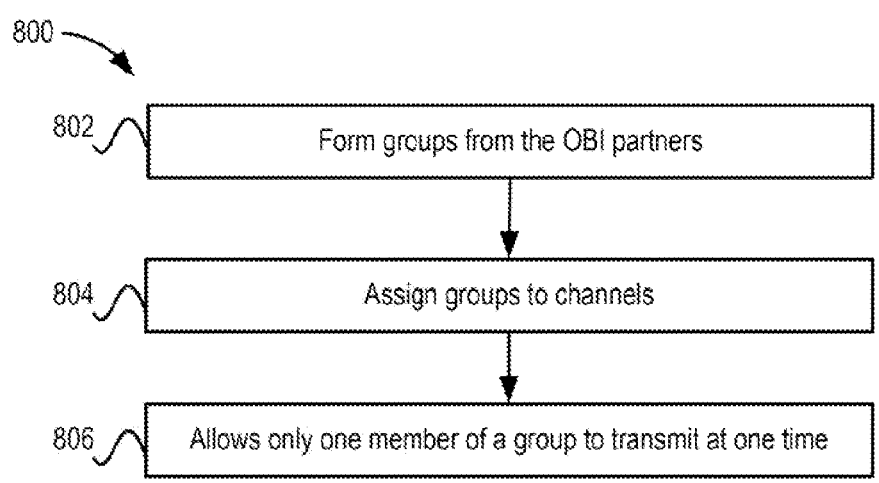
FIG. 8 depicts a simplified flowchart of a method for mitigation using channel and group assignment according to one embodiment.

FIG. 8 depicts a simplified flowchart 800 of a method for mitigation using channel and group assignment according to one embodiment. At 802, once the OBI partners are identified, mitigation manager 204 may form groups from the OBI partners. In one embodiment, each OBI group contains ONUs 305 that can cause OBI to other members in the group, but cannot cause OBI to members of other groups. So, any given OBI partners are within the same OBI group.

At 804, mitigation manager 204 assigns groups to channels. At 806, mitigation manager 204 then allows only one member of a group to transmit at one time. For example, mitigation manager 204 schedules the groups such that one member of the group is allowed to transmit at any specific point in time. One way mitigation manager 204 accomplishes this is to assign members of a given group to use only one single time division multiplexed upstream channel.

In some cases, members of different groups can transmit simultaneously without causing OBI and therefore mitigation manager 204 assigns different groups to different channels. If there are more upstream channels than OBI groups, then mitigation manager 204 can assign each group to a unique channel. If there are more OBI groups than channels, mitigation manager 204 can decide which groups share given channels based on various factors, such as the number of devices in each group and the relative traffic load from each group. Also, mitigation manager 204 may choose to change an OBI group's channel assignment dynamically over time to load balance traffic throughout RFoG network 215. This may result in better user experience, such as higher throughput.

Also, some ONUs 305 may not have any OBI partners and thus cannot cause OBI with any other ONU. Mitigation manager 204 may place these non-OBI ONUs 305 on all channels simultaneously and with any of the groups.

Figure 9:
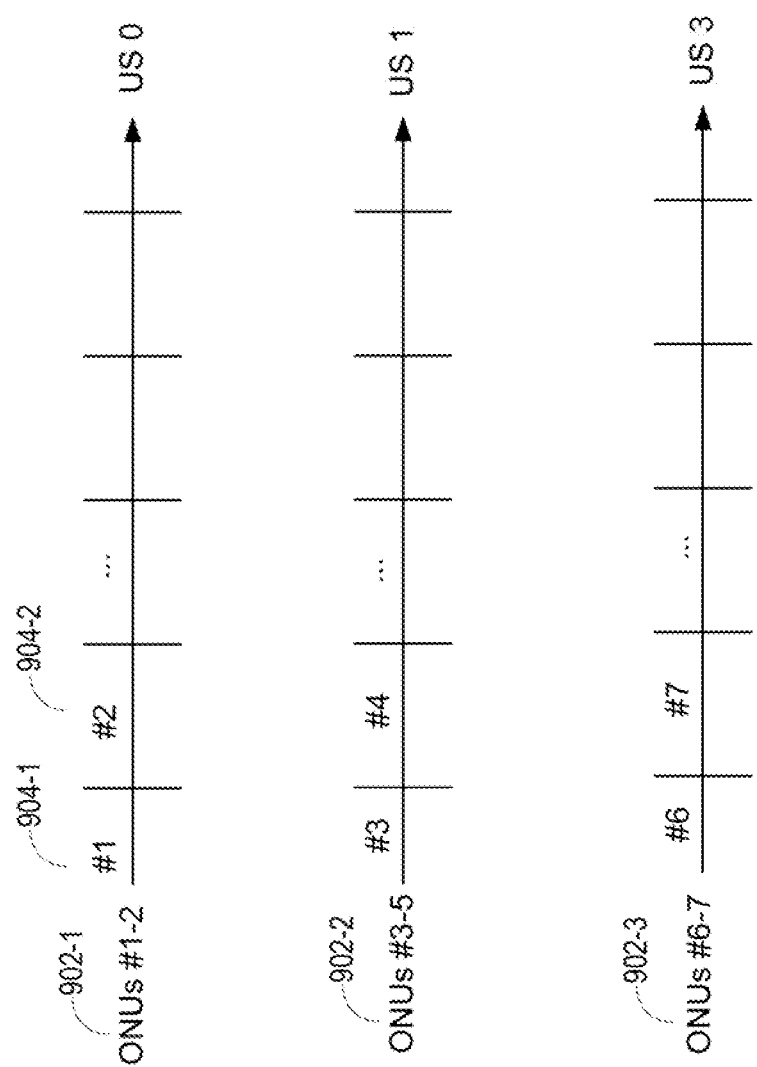
FIG. 9 depicts an example of assigning groups to channels according to one embodiment.

FIG. 9 depicts an example of assigning groups to channels according to one embodiment. At 902-1, a group #1 includes ONU #1 and ONU #2 in which ONU #1 and ONU #2 are OBI partners. That is, ONUs #1 and #2 may interfere with each other if transmitting simultaneously. ONU #1 and ONU #2 transmit on a single channel US 0, which is time division multiplexed, which means ONU #1 and ONU #2 cannot transmit at the same time and cause OBI. Other groups are assigned to other channels US 1 and US 2, respectively, such as at 902-2, a group #2 includes ONUs #3-5, and at 902-3, a group #3 includes ONUs #6-7. Similarly, ONUs for respective channels US 1 and US 2 communicate in a time division multiplexed manner.

As shown, in a first time slot at 904-1, ONU #1, ONU #3, and ONU #6 transmit on respective channels #1-#3. In a second time slot 904-2, ONU #2, ONU #4, and ONU #7 transmit on respective channels #1-#3. Because ONU partners are grouped together on the same channel, OBI interference does not result.

As traffic demand increases or the number of OBI partners grow, it is possible that the mitigation process of assigning groups to channels may limit throughput. The following describes another mitigation process that is based on scheduling that may increase throughput.

Mitigation By Scheduling

A schedule-based mitigation approach may become appropriate to better use available bandwidth or to increase throughput where mitigation manager 204 schedules ONUs 305 such that OBI does not occur. For example, mitigation manager 204 may schedule an ONU 305, but ensure that none of its OBI partners transmit during that same time slot as well. That is, mitigation manager 204 may allow an ONU 305 to transmit across multiple channels instead of just one channel, which will allow ONU 305 to achieve full burst bandwidth capabilities. First, mitigation manager 204 may determine all OBI partners for every ONU. Then, mitigation manager 204 schedules user devices 220 from ONUs 305 such that other user devices 220 that may be OBI partners with the scheduled user devices 220 are not scheduled during the same time slot. For example, it may be possible that all user devices 220 coupled to an ONU 305 may not be OBI partners. In this case, mitigation manager 204 may schedule user devices 220 coupled to the same ONU 305 on multiple channels in the same time slot. This allows multiple user devices 220 from different groups plus non-OBI user devices 220 to transmit simultaneously to allow for maximum upstream bandwidth utilization.

Figure 10:

To illustrate the above scheduling process, FIGS. 10 and 11 illustrate the identification and grouping process according to one embodiment. FIG. 10 shows a table 1100, in which a first column 1102 identifies each ONU 305 by number, such as #1. Columns 1104 and 1106 identify the frequencies on which each ONU transmits. A column 1108 identifies any OBI partners with the respective ONU. A column 1110 shows the maximum frequency distance (pm) from the ONU and the OBI partners.

FIG. 11 shows the groups that can be determined based on the results in table 1100 according to one embodiment. For example, a group #0 includes members #1, 7, 8, 17, and 20. The other groups 1-5 include 5 members, 12 members, 6 members, 2 members, and 2 members, respectively. Group #5 may be the non-OBI group in which these members can be placed on any channels.

To determine a group, identification manager 202 may start with ONU #1 and determine that its OBI partner is ONU #20. Identification manager 202 then places ONUs #1 and #20 into group #0. Then, referring to ONU #20, ONUs #1 and #17 are partners with ONU #20. Thus, ONU #17 is added to group #0. Since ONU #17 is new to the group, identification manager 202 determines that ONU #17 has OBI partners of #8 and #20. ONU #20 is already part of group #0, but ONU #8 is not. Identification manager 202 thus adds ONU #8 to group 0. Then, looking at ONU #8, ONU #8 has OBI partners of ONUs #7 and #17. ONU #17 is already part of group #0, but ONU #7 is not and is added to group 0. Looking at ONU #7, ONU #8 is an OBI partner, but #8 is already a member of group #0. No more ONUs are new to the group, and the process ends. This process continues as identification manager 202 performs the same process with other ONUs not already in a group (e.g., starting with ONU #2) to determine the other group members.

Once identification manager 202 determines all the groups, members of different groups do not OBI with each other. However, with the exception of group #5, it is possible that members of each group may OBI with each other.

Using this knowledge, as described above, mitigation manager 204 may assign groups to channels. For example, when there are only two channels, mitigation manager 204 may assign groups #0, #1, and #3 to a first channel US 0 for a total of 16 ONUs, and groups #2, #4, and #5 are assigned to channel US 1 for a total of 16 ONUs. Mitigation manager 204 may assign group #5 of the non-OBI candidates to both channels simultaneously. The above assignment may result in no OBI. If additional channels are used, such as 4 channels, then mitigation manager 204 may assign groups #0 and #4 to a first channel US 0, groups #1 and #5 to a second channel US 1, group #2 to a third channel US 2, and group #3 to a fourth channel US 3.

In the above groupings in FIG. 11, not all members of a group may be OBI partners. For example, it is possible that each group may only have a small handful of OBI partners. In group #0, ONU #1 is only an OBI partner with ONU #20 and not OBI partners with ONUs #7, #8, and #17. In one embodiment, mitigation manager 204 may enhance the above scheduling process to only block OBI pairs or partners within a group in a given time slot when a given user device 220 transmits through an ONU 305 rather than blocking all members of the OBI group that are coupled to other ONUs 305 that are in the group. In the grouping above, most ONUs 305 only block one or two other ONUs 305 in a given time slot. This may cause significantly less blocking in the scheduling process than blocking all members of an OBI group and may further utilize available bandwidth and channels.

In another case, another enhancement to the scheduling process may be used in an MDU environment where multiple user devices 220 may reside behind a single ONU 305. As described above, OBI occurs only when two ONUs 305 transmit with closely spaced wavelengths. However, mitigation manager 204 only sees and controls user devices 220 behind each ONU 305. For example, if a first ONU A and a second ONU B are OBI partners and each have a half dozen user devices behind each, such as user devices A1-A6 are behind ONU A and user devices B1-B6 are behind ONU B, with the grouping approach, all 12 user devices 220 are forced into the same group and mitigation manager 204 can only schedule one user device A1-A6 and B1-B6 at a time. This requires 12 separate time slots to cycle through each user device 220.

The OBI partner list for user device A1 is user devices B1-B6 inclusive. The OBI partner list for user device A2 is also the same, user devices B1-B6. However, user devices A1 and A2 are not OBI partners and could be allowed to transmit at the same time. Similarly, user devices B1 and B2 would have a partner list that includes user devices A1-A6, but not each other. Thus, mitigation manager 204 may schedule all of the user devices B1-B6 during another time slot. In this case, mitigation manager 204 may cycle through all twelve user devices in two slots rather than twelve time slots using the above approach which substantially reduces latencies and improves efficiencies.

Scheduling Based on Business Customers

In one example, assigning a single channel for use by many users may avoid OBI but it may not yield acceptable quality of service for business customers that may require higher throughputs and small latency. To offer higher capacity and lower latency to business customers, particular embodiments may place business customers on a different channel than a channel hosting the rest of the OBI partners. However, placing the OBI partners (e.g., the business customer and the rest of the OBI partners) on different channels may result in OBI. Particular embodiments may provide multiple ways to detect and avoid OBI in the two-channel case. Also, although business customers are described, the following process may be used for any situations in which two ONUs 305 that may incur OBI are placed on different channels.

Mitigation manager 204 may place the one business customer on a first channel US 0 and the other OBI partners on a second channel US 1. Mitigation manager 204 then resumes normal scheduling for all channel transmissions without regard to coordinating transmissions between the two channels hosting the business customer and the rest of the OBI partners. Mitigation manager 204 then sets a trap/event such that when an OBI event occurs, the following may be performed. First, the trap/event causes errors for the business customer and OBI partner on a channel hosting all OBI partners, mitigation manager 204 identifies the transmitting user device 220 on channel US 1 and marks that user device as an OBI candidate interfering with the business customer on channel US 0. Next time, mitigation manager 204 schedules transmissions to coordinate between the two channels US 0 and US 1 to avoid simultaneous transmissions from the business customer and the interfering OBI partner. Second, if an error is caused for the business customer and an OBI that is not on a channel hosting the OBI partner or the business customer (i.e., it is on a third channel), mitigation manager 204 identifies this user device 220 as an OBI candidate that interferes with the business customer and places that customer in the channel that hosts the rest of the OBI partners. Next time, mitigation manager 204 schedules transmissions to coordinate between the two channels US 0 and US 1 to avoid simultaneous transmissions from the business customer and the new interfering OBI partner. Third, when an error is caused for a user device 220 on channel US 1 and another user device on a third channel US 2, then mitigation manager 204 places this user device 220 in channel US 1, but does not mark this user device 220 as an interferer with the business customer.

Mitigation manager 204 then resumes scheduling considering the coordination of transmissions between channels US 0 and US 1. The coordination may be performed to avoid simultaneous transmissions from the business customer and any OBI partners that are marked as interfering with the business customer.

In some cases, it may not be possible to monitor every FEC count continuously, but it may be possible to monitor the FEC counts over a longer period of time. In this case, mitigation manager 204 may identify OBI candidates as follows. At the end of monitoring window, once the FEC counts are checked and errors are found for the business customer, mitigation manager 204 checks the FEC counts of all user devices 220 that are transmitted on channel US 1 during monitoring window. Mitigation manager 204 distributes the OBI partners that experienced FEC errors such that their transmissions occur in multiple monitoring windows in the future. The above is repeated until the OBI interferer is found or singled out based on the scheduling above. This user device 220 is marked as an OBI interferer with the business customer.

Next, mitigation manager 204 schedules transmissions on all channels with coordination on channels US 0 and US 1 such that no simultaneous transmissions from the business customer and the marked interfering OBI partners are made. As described above, there may be where interference occurs between user device from a third channel and the business customer. Mitigation manager 204 performs the same approach as above to identify the interfering user device 220 and that user device 220 is placed on channel US 1 and marked as an interfering user device to the business customer. Also, there may be a step where the interference occurs between a user device 220 from a third channel and a user device 220 on channel US 1. Identification manager 202 identifies the interfering customer and places that user device 220 on channel US 1, but does not mark that user 220 as interfering with the business customer.

Preamble Protection and OBI Reduction

The laser transmitters in ONUs 305 may have multiple issues. For example, a laser transmitter may take some time (e.g., on the order of a few nanoseconds) to turn on. Also, the wavelength of the laser transmitter changes over time. The first microseconds may experience a fast change in the wavelength (e.g., 150 pm on average) but after the laser heats up, the change in wavelength may be small (150 pm/a few milliseconds).

The first problem causes damage to the beginning of the signal to be transmitted because the laser is still off while the samples form the beginning of the signal. These signals may represent part of a known signal pattern (e.g., preamble) that help the receiver require the frequency, time, and phase information regarding the incoming signal. The partial damage to the incoming preamble may degrade the performance of the receiver.

The second problem causes more likelihood for OBI where the wavelength sweeps a large frequency range in a very small amount of time. The large sweep causes more likelihood for the wavelength to collide with other wavelengths that are being transmitted. This causes larger damage to the preamble of the signal of interest because its wavelength may collide with one or more other wavelengths during the short amount of time due to the large range of the wavelength of the starting-up laser. Not only is the signal of interest affected, but all the signals that are being transmitted through RFoG network 215 during the OBI event are affected.

Particular embodiments may solve the problems above via different methods. For example, for the first problem, OBI manager 100 may detect a sequence to be transmitted and delay it or buffer it (e.g., via member buffers or tapped delay lines, etc.), such that the sequence is transmitted when the transmitter is fully on and therefore the preamble is not affected during the time it takes the laser to turn on. The delay line is used to give the laser time to warm up such that it will not drift as much in frequency and consequently possibly avoid interfering with some other ONUs 305 before the desired signal is actually transmitted by the laser. The headend may ignore the extra time that the laser is on at the beginning of the transmission. Additionally, this problem may be solved by the solution proposed below to address the second problem.

For the second problem above, an ONU 305 may exercise a laser transmitter for some time while an optical switch connecting the transmitter to laser is open. Once the transmitter heats up, the optical switch is closed. Transmissions after an initial period, such as a first few microseconds or few seconds, should occur on slowly moving wavelength and this significantly reduces the likelihood of OBI. The delay added inside the ONU 305 may simply make the user device 220 seem like it is farther away from CMTS 105 and could be compensated for in the overall system, such as via a ranging process. The additional guard time between bursts may be needed to avoid the situation where consecutive bursts overlap with each other. This can happen if the incoming burst rate is higher than the outgoing burst rate (i.e., the guard time is smaller than the delay inside ONU 305 leading to intersymbol interference (ISI)). The guard time is a configurable parameter in the modulation profile and can easily be increased. The delay may be also provided by using a longer preamble.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising: determining, by a computing device, a plurality of communication devices in which to test for optical interference in a communication network; causing, by the computing device, the plurality of communication devices to transmit through the communication network; identifying, by the computing device, possible optical interference partners between communication devices in the plurality of communication devices based on the plurality of communication devices transmitting through the communication network, wherein optical interference partners cause optical interference when transmissions overlap in time based on their wavelength proximity, wherein identifying comprises: scheduling a first communication device in the plurality of communication devices on a first communication channel, wherein the first communication device is the only communication device to transmit on the first communication channel for a period of time; scheduling second communication devices from the plurality of communication devices on a second communication channel, wherein the second communication devices transmit serially on the second communication channel for the period of time; and analyzing error information that results based on transmissions, from the first communication device and the second communication devices on the first communication channel and the second communication channel, overlapping in time during the period of time to identify the possible optical interference partners; and mitigating, by the computing device, a possible optical interference between possible optical interference partners based on a mitigation scheme.

2. The method of claim 1, wherein different second communication devices are switched with the first communication device on the first communication channel in a combinatorial manner to test the plurality of communication devices for possible optical interference.

3. The method of claim 1, wherein each of the second communication devices are scheduled in a respective time slot on the second communication channel, the method further comprising: determining when possible optical interference occurred during the time slot; and marking the respective second communication device that is scheduled during that time slot as a possible optical interference partner when an error occurs during the time slot.

4. The method of claim 1, wherein causing the plurality of communication devices to transmit through the communication network comprises sending a communication to respective user devices coupled to the plurality of communication devices causing the respective user devices to transmit through respective communication devices.

5. The method of claim 1, wherein mitigating comprises: assigning the communication devices in the plurality of communications devices to a plurality of groups, including assigning communication devices in the plurality of communications devices that are determined to be possible optical interference partners into a single group in the plurality of groups, where communication devices in different groups in the plurality of groups have been determined to not be possible optical interference partners; and scheduling only one member from at least a portion of the plurality of groups to transmit at any time slot.

6. The method of claim 5 wherein communication devices that are determined to not be possible optical interference partners with any other communication devices in the plurality of communication devices are scheduled to transmit with any of the plurality of groups.

7. The method of claim 1, wherein mitigating comprises: assigning the communication devices in the plurality of communications devices to a plurality of groups, including assigning communication devices in the plurality of communications devices that are determined to be possible optical interference partners into a single group in the plurality of groups, where communication devices in different groups in the plurality of groups have been determined to not be possible optical interference partners; and scheduling multiple communication devices from the plurality of different groups to transmit at a same time slot on multiple communication channels, wherein the multiple communication devices have been determined to not be possible optical interference partners with each other.

8. The method of claim 1, wherein:
an optical switch is open for one of the communication devices for a period of time when a transmitter in the one of the communication devices starts to transmit such that a signal from the transmitter is not transmitted through the communication network; and
the optical switch is closed after the period of time to allow the signal from the transmitter to transmit through the communication network.

9. The method of claim 1, wherein:
a delay line for one of the communication devices delays a transmission for a period of time when a transmitter in the one of the communication devices starts to transmit such that the transmission from the transmitter is not transmitted through the communication network for the period of time.

10. A method comprising:
determining, by a computing device, a plurality of communication devices in which to test for optical interference in a communication network;
causing, by the computing device, the plurality of communication devices to transmit through the communication network;
identifying, by the computing device, possible optical interference partners between communication devices in the plurality of communication devices based on the plurality of communication devices transmitting through the communication network, wherein optical interference partners cause optical interference when transmissions overlap in time based on their wavelength proximity,
wherein identifying comprises:
scheduling a group of the plurality of communication devices on available communication channels through the communication network;
determining when possible optical interference occurred for the group of the plurality of communication devices; and
when the possible optical interference occurred, splitting the group into a first group and a second group and repeating the scheduling and determining until optical interference partners between two communication devices is determined; and
mitigating, by the computing device, the possible optical interference between possible optical interference partners based on a mitigation scheme.

11. The method of claim 10, wherein causing the plurality of communication devices to transmit through the communication network comprises sending a communication to respective user devices coupled to the plurality of communication devices causing the respective user devices to transmit through respective communication devices.

12. The method of claim 10, wherein mitigating comprises: assigning the communication devices in the plurality of communications devices to a plurality of groups, including assigning communication devices in the plurality of communications devices that are determined to be possible optical interference partners into a single group in the plurality of groups, where communication devices in different groups in the plurality of groups have been determined to not be possible optical interference partners; and scheduling only one member from at least a portion of the plurality of groups to transmit at any time slot.

13. The method of claim 12, wherein any communication devices that are determined to not be possible optical interference partners with any other communication devices in the plurality of communication devices are scheduled with any of the plurality of different groups.

14. The method of claim 10, wherein mitigating comprises: assigning the communication devices in the plurality of communications devices to a plurality of groups, including assigning communication devices in the plurality of communications devices that are determined to be possible optical interference partners into a single group in the plurality of groups, where communication devices in different groups in the plurality of groups have been determined to not be possible optical interference partners; and scheduling multiple communication devices from the plurality of groups to transmit at a same time slot on multiple communication channels, wherein the multiple communication devices have been determined to not be possible optical interference partners with each other.

15. The method of claim 10, wherein:
an optical switch is open for one of the communication devices for a period of time when a transmitter in the one of the communication devices starts to transmit such that a signal from the transmitter is not transmitted through the communication network; and
the optical switch is closed after the period of time to allow the signal from the transmitter to transmit through the communication network.

16. The method of claim 10, wherein:
a delay line for one of the communication devices delays a transmission for a period of time when a transmitter in the one of the communication devices starts to transmit such that the transmission from the transmitter is not transmitted through the communication network for the period of time.

17. A method comprising: determining, by a computing device, a plurality of communication devices in which to test for optical interference in a communication network; causing, by the computing device, the plurality of communication devices to transmit through the communication network; identifying, by the computing device, possible optical interference partners between communication devices in the plurality of communication devices based on the plurality of communication devices transmitting through the communication network, wherein optical interference partners cause optical interference when transmissions overlap in time based on their wavelength proximity,
mitigating, by the computing device, a possible optical interference between possible optical interference partners based on a mitigation scheme, wherein mitigating comprises: scheduling a first set of the plurality of communication devices on a first communication channel; scheduling a second set of the plurality of communication devices on a second communication channel, wherein the first set of the plurality of communication devices and the second set of the plurality of communication devices are possible optical interference partners; determining when optical interference occurs between a communication device in the first set of the plurality of communication devices and a communication device in the second set of the plurality of communication devices; and marking the communication device in the first set of the plurality of communication devices to not be scheduled to transmit at a same time as the communication device in the second set of the plurality of communication devices.

18. The method of claim 17, further comprising:
determining when optical interference occurs between one of the second set of the plurality of communication devices and one of a third set of the plurality of communication devices communicating on a third communication channel;
marking the one of the third set of the plurality of communication devices to not be scheduled to transmit at a same time as the one of the second set of the plurality of communication devices; and
moving the one of the third set of the plurality of communication devices to the first communication channel.

19. The method of claim 17, further comprising:
determining when optical interference occurs between one of the first set of the plurality of communication devices and one of a third set of the plurality of communication devices communicating on a third communication channel; and
moving the one of the third set of the plurality of communication devices to the first communication channel.

20. The method of claim 17, wherein causing the plurality of communication devices to transmit through the communication network comprises sending a communication to respective user devices coupled to the plurality of communication devices causing the respective user devices to transmit through respective communication devices.

21. The method of claim 17, wherein:
an optical switch is open for one of the communication devices for a period of time when a transmitter in the one of the communication devices starts to transmit such that a signal from the transmitter is not transmitted through the communication network; and
the optical switch is closed after the period of time to allow the signal from the transmitter to transmit through the communication network.

22. The method of claim 17, wherein:
a delay line for one of the communication devices delays a transmission for a period of time when a transmitter in the one of the communication devices starts to transmit such that the transmission from the transmitter is not transmitted through the communication network for the period of time.

23. An apparatus comprising: one or more computer processors; and a non-transitory computer-readable storage medium comprising instructions that, when executed, control the one or more computer processors to be configured for: determining a plurality of communication devices in which to test for optical interference in a communication network; causing the plurality of communication devices to transmit through the communication network; identifying possible optical interference partners between communication devices in the plurality of communication devices based on the plurality of communication devices transmitting through the communication network, wherein optical interference partners cause optical interference when transmissions overlap in time based on their wavelength proximity, wherein identifying comprises: scheduling a first communication device in the plurality of communication devices on a first communication channel, wherein the first communication device is the only communication device to transmit on the first communication channel for a period of time; scheduling second communication devices from the plurality of communication devices on a second communication channel, wherein the second communication devices transmit serially on the second communication channel for the period of time; and analyzing error information that results based on transmissions from the first communication device and the second communication devices on the first communication channel and the second communication channel overlapping in time during the period of time to identify the optical interference partners; and mitigating a possible optical interference between possible optical interference partners based on a mitigation scheme.

24. The apparatus of claim 23, wherein mitigating comprises: scheduling a first set of the plurality of communication devices on the first communication channel; scheduling a second set of the plurality of communication devices on the second communication channel, wherein the first set of the plurality of communication devices and the second set of the plurality of communication devices are possible optical interference partners; determining when optical interference occurs between one of the first set of the plurality of communication devices and one of the second set of the plurality of communication devices; and marking the one of the first set of the plurality of communication devices to not be scheduled to transmit at a same time as the one of the second set of the plurality of communication devices.

25. An apparatus comprising:
one or more computer processors; and
a non-transitory computer-readable storage medium comprising instructions that, when executed, control the one or more computer processors to be configured for:
determining a plurality of communication devices in which to test for optical interference in a communication network;
causing the plurality of communication devices to transmit through the communication network;

identifying possible optical interference partners between communication devices in the plurality of communication devices based on the plurality of communication devices transmitting through the communication network, wherein optical interference partners cause optical interference when transmissions overlap in time based on their wavelength proximity, wherein identifying comprises:
scheduling a group of the plurality of communication devices on available communication channels through the communication network;
determining when possible optical interference occurred for the group of the plurality of communication devices; and
when the possible optical interference occurred, splitting the group into a first group and a second group and repeating the scheduling and determining until optical interference partners between two communication devices is determined; and
mitigating the possible optical interference between possible optical interference partners based on a mitigation scheme.

26. The apparatus of claim 25, wherein mitigating comprises: scheduling a first set of the plurality of communication devices on the first communication channel; scheduling a second set of the plurality of communication devices on the second communication channel, wherein the first set of the plurality of communication devices and the second set of the plurality of communication devices are possible optical interference partners; determining when optical interference occurs between one of the first set of the plurality of communication devices and one of the second set of the plurality of communication devices; and marking the one of the first set of the plurality of communication devices to not be scheduled to transmit at a same time as the one of the second set of the plurality of communication devices.

27. An apparatus comprising: one or more computer processors; and a non-transitory computer-readable storage medium comprising instructions that, when executed, control the one or more computer processors to be configured for: determining a plurality of communication devices in which to test for optical interference in a communication network; causing the plurality of communication devices to transmit through the communication network; identifying possible optical interference partners between communication devices in the plurality of communication devices based on the plurality of communication devices transmitting through the communication network, wherein optical interference partners cause optical interference when transmissions overlap in time based on their wavelength proximity, mitigating a possible optical interference between possible optical interference partners based on a mitigation scheme, wherein mitigating comprises: scheduling a first set of the plurality of communication devices on a first communication channel; scheduling a second set of the plurality of communication devices on a second communication channel, wherein the first set of the plurality of communication devices and the second set of the plurality of communication devices are possible optical interference partners; determining when optical interference occurs between one of the first set of the plurality of communication devices and one of the second set of the plurality of communication devices; and marking the one of the first set of the plurality of communication devices to not be scheduled to transmit at a same time as the one of the second set of the plurality of communication devices.

28. A method comprising: determining, by a computing device, a plurality of communication devices in which to test for optical interference in a communication network; causing, by the computing device, the plurality of communication devices to transmit through the communication network; determining possible optical interference partners between the communication devices in a the plurality of communication devices, wherein optical interference partners cause optical interference when transmissions are received at a similar time at a similar wavelength from the communication network; assigning the communication devices in the plurality of communications devices to a plurality of groups, including assigning communication devices in the plurality of communications devices that are determined to be possible optical interference partners with each other but not to a remaining one or more communications devices in the plurality of communications devices to a single group in the plurality of groups, and assigning the remaining one or more communication devices in the plurality of communications devices to one or more different groups in the plurality of groups; assigning, by the computing device, each of the plurality of groups of communications devices to a respective one of a plurality of channels, wherein the group assigned to a channel only transmits on that channel; and scheduling multiple communication devices from the plurality of groups to transmit at a same time slot on the respective assigned one of the plurality of channels.

29. The method of claim 28, wherein scheduling comprises scheduling each of the multiple communication device from the respectively assigned group to transmit in the same time slot on the assigned group's respectively assigned channel.

* * * * *